INVENTORS
GILBERT MAROSI
DONN W. SODERQUIST
BY
Edward A. Robinson
ATTORNEY

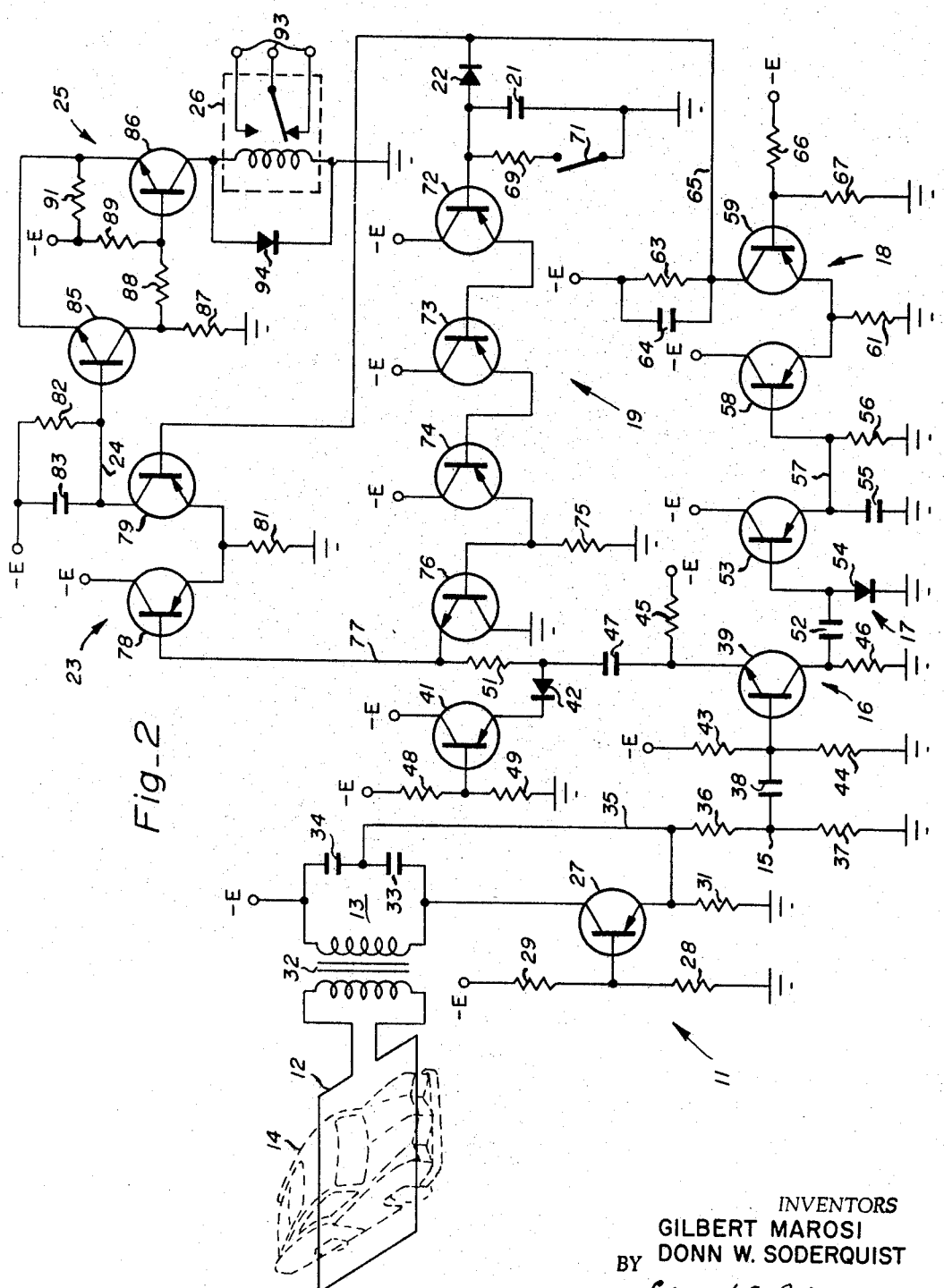

United States Patent Office 3,451,041
Patented June 17, 1969

3,451,041
VEHICLE PRESENCE DETECTOR SYSTEM
Gilbert Marosi, Sunnyvale, and Donn W. Soderquist, San Jose, Calif., assignors to Singer-General Precision, Inc., Binghamton, N.Y., a corporation of Delaware
Filed Apr. 4, 1966, Ser. No. 539,676
Int. Cl. G08g 1/01
U.S. Cl. 340—38         10 Claims

ABSTRACT OF THE DISCLOSURE

This invention relates to a system for detecting the presence of vehicles which may move along traffic lanes of highways or along railroad tracks, or the like; and, more particularly, this invention relates to such a system utilizing an inductive loop which is imbedded in the paving beneath the traffic lane or positioned beneath the rails of a railroad track such that the metallic mass of a vehicle passing thereover will vary the Q-factor value of the inductive loop, which variation is sensed to provide an output signal and/or a switching operation of an output relay.

---

Figure 1:
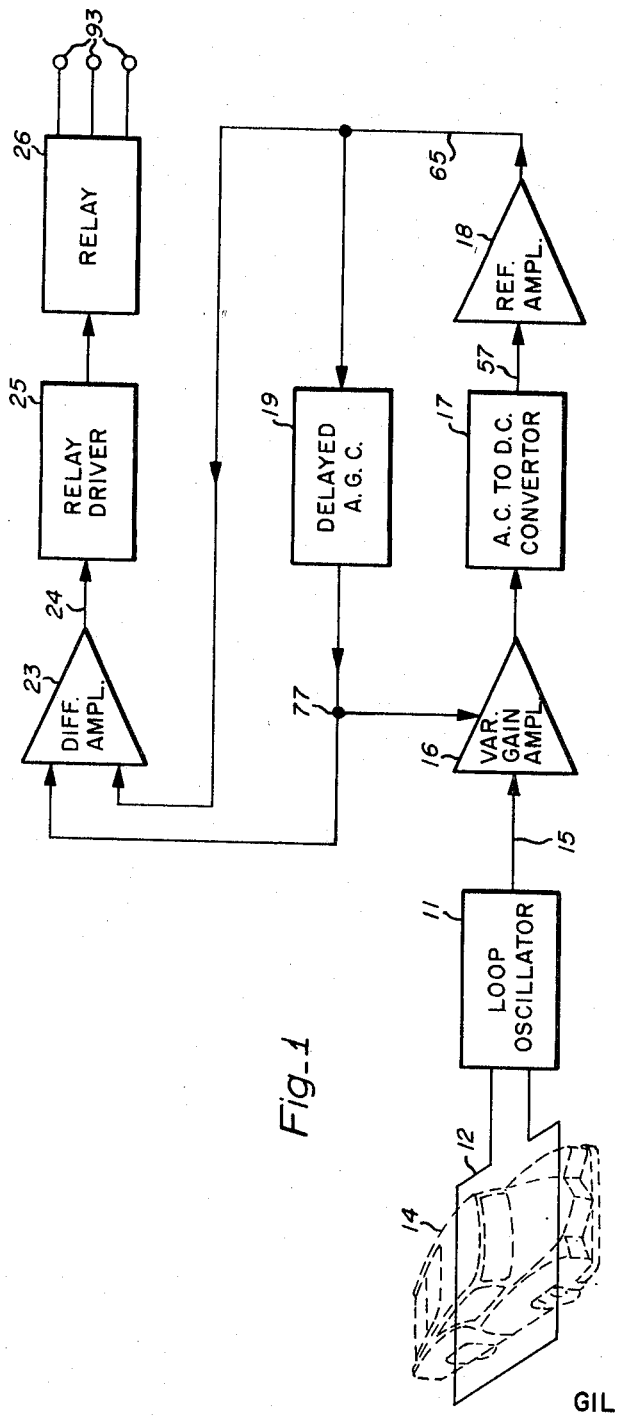

A patent, No. 3,164,802, has been granted to Robert A. Kleist and John Scarbrough on Jan. 5, 1965, entitled, "Inductive Loop Vehicle Presence Detector," which has disclosed several sytems for detecting vehicles by the use of inductive loops. In the systems disclosed, the inductive loop is coupled into the resonant or tank circuit of an oscillator; and when the metallic mass of a vehicle passes over the loop, the inductive value thereof decreases, thereby causing the oscillator to increase its frequency of oscillation. Various methods and circuits are disclosed for detecting the change in the oscillation frequency.

A further vehicle detection system has been disclosed in Patent No. 2,917,732, granted to W. P. Chase et al., Dec. 15, 1959. The system disclosed by this patent uses a loop oscillator with a long time constant mechanical servo arranged to correct oscillator drift, resulting in gradual variations in the frequency of the signal therefrom. Since the passage of vehicles will cause abrupt changes in the oscillator signal, the long time constant servo will not interfere with the output switching and unbalance caused by vehicles, but will continually compensate for the slow environmental changes. Although the long time constant servo corrects for gradual drift of the oscillator, this servo is considered undesirable because of the use of mechanical elements and moving parts within the system.

It is an object of this invention to provide an improved vehicle detector having an inductive loop, and, more particularly, it is an object to provide a presence detector having an oscillator wherein the inductive loop is coupled as a part of the resonant circuit and further functions to load the oscillator such that the oscillator signal will decrease in amplitude as a vehicles moves over the loop.

It is a further object of this invention to provide an improved vehicle presence detector system wherein an amplitude variation from a loop oscillator circuit is representative of the presence of a vehicle and is detected by sensing the change in amplitude by circuitry including a feedback path, the feedback path not encompassing the oscillator, which may be free-running at a frequency determined by the parameters of the loop and the tuned circuit including the loop.

Another object is to provide an improved vehicle presence detector system which includes an oscillator which need not be tuned when electrically coupled to an inductive loop; and, more particularly, it is an object to provide subsequent circuitry coupled to the oscillator which will sense amplitude variations in the oscillator signal whereby the frequency of oscillation and the absolute value of the amplitude of the oscillator signal will be of no consequence.

Numerous other objects and advantages of this invention will be apparent throughout the progress of the specification which follows. The accompanying drawings illustrate a certain exemplary embodiment of this invention and the views thereof are as follows:

FIGURE 1 is a system diagram of the vehicle presence detector of this invention wherein the various component circuits are shown as blocks; and FIGURE 2 is a detailed diagram of the presence detector system showing the complete circuits of all of the component parts.

Briefly stated, according to a preferred form of this invention, the presence detector system comprises an oscillator 11, including an inductive loop 12. The loop 12 is coupled into a resonant circuit 13 of the oscillator and will pass currents therethrough at the resonant frequency. When a vehicle 14 moves over the loop 12, the metallic mass of the vehicle will be inductively coupled to the loop and will absorb power, effectively reducing the Q-factor value of the resonant circuit. The oscillator is loaded by the vehicle's presence, and the amplitude of the oscillator signal appearing on the lead 15 will decrease from a normal value. The signal from the oscillator 11 is passed by a variable gain amplifier 16 to an alternating-current-to-direct-current converter or rectifier circuit 17. A reference amplifier 18 passes a direct potential level corresponding with the amplitude of the oscillator signal as passed by the amplifier 16. A feedback path, or automatic gain control (AGC), circuit is provided to control the gain of the amplifier 16.

The AGC circuit 19 includes a signal storage means, such as capacitor 21, coupled to the amplifier 18 by a diode 22 for delaying changes in the AGC voltage. The diode passes signal levels of one polarity directly from the amplifier 18 to the capacitor 21, and isolates the capacitor 21 during intervals when the signal variation is of the opposite polarity. A differential amplifier 23 senses any difference between the voltage level of the amplifier 18 and the AGC voltage level to provide an output signal on a lead 24. A final stage of amplification or relay driver 25 provides power for the operation of a relay 26 which may be used in conjunction with this presence detector system.

As shown in FIGURE 2, the oscillator 11 comprises a transistor 27 and the tuned circuit 13 coupled between the collector electrode of the transistor and a negative voltage source −E. This circuit is substantially that of a conventional Colpitts oscillator. The base electrode of the transistor 27 is biased by a pair of potential dividing resistors 28 and 29 connected between the ground reference potential and the voltage source −E. The emitter electrode of the transistor 27 is coupled to the ground reference potential by a load resistor 31. The tuned circuit 13 includes the inductive loop 12, a coupling transformer 32, and a pair of serially connected capacitive elements 33 and 34. The serial connection point between the capacitors 33 and 34 is directly connected to the emitter electrode of the transistor 27 by a lead 35, constituting a positive feedback path to sustain oscillations. The oscillator signal is passed by a pair of potential dividing resistors 36 and 37 and appears at the output lead 15 of the oscillator 11.

The oscillator signal is passed by a coupling capacitor 38 to the base electrode of a transistor 39. The transistor 39, together with another transistor 41 and a diode 42, constitute the variable gain amplifier 16. The base electrode of the transistor 39 is biased by a pair of potential dividing resistors 43 and 44 which are coupled between reference voltage −E and the ground reference potential. The emitter electrode of the transistor 39 is coupled to the negative reference voltage —E by a resistor 45, and the collector electrode is coupled to the ground reference potential by a load resistor 46.

The gain of the amplifier 16 is controllable by varying conduction through transistor 41 and the diode 42, and is equal to the ratio of the collector resistance to the emitter resistance. The collector resistance is the value of resistor 46, but the emitter resistance is the value of resistor 45 in parallel with the resistance of the diode 42. A coupling capacitor 47 will block the flow of direct current from the emitter electrode of the transistor 39, but the alternating currents amplifier thereby will be passed by the capacitor 47 to the diode 42 and the transistor 41, which are effectively in parallel or shunted across the emitter resistor 45. The base electrode of the transistor 41 is biased by a pair of potential dividing resistors 48 and 49 connected between the negative voltage supply —E and the ground reference potential. The degree of conduction of the diode 42 and of the transistor 41 is determined by an AGC voltage which is passed by a resistor 51. The means for generating the AGC voltage will be discussed subsequently.

The amplifier oscillator signal from the variable gain amplifier 16 is passed by a coupling capacitor 52 to the base electrode of a transistor 53. The base electrode of the transistor 53 is coupled to ground by a diode 54 which effectively references the amplified oscillator signal below ground. The transistor 53 is connected as an emitter follower with the collector electrode directly connected to the negative voltage source —E. A negative signal level, corresponding to the peak negative out of the amplifier, is stored in a capacitor 55 which is shunted by a resistor 56 to provide a time constant discharge of the capacitor 55. Therefore, the signal level appearing on a lead 57 will correspond to the amplitude of the signal which has been amplified by the circuit 16.

The reference amplifier 18 comprises two transistors 58 and 59 connected as a differential amplifier. Both of the emitter electrodes of the transistors 58 and 59 are coupled to the ground reference potential by a common resistor 61. The collector electrode of the transistor 58 is directly connected to the negative voltage source —E, and the collector electrode of the transistor 59 is coupled to the negative voltage source —E by a resistor 63 which is bypassed by a capacitor 64 to eliminate alternating components on the direct potential level which will appear on a lead 65. A pair of potential dividing resistors 66 and 67 are connected between the negative voltage source —E and the ground reference potential to provide a reference voltage which is applied to the base electrode of the transistor 59. Therefore, the signal appearing on the lead 65 will correspond with the amplified difference between the voltage level appearing on the lead 57 applied to the base electrode of the transistor 58 and a standard voltage level established by the resistors 66 and 67 applied to the base electrode of the transistor 59. The signal level appearing on the lead 65 is of negative polarity and will be passed by the diode 22 to be stored in the capacitor 21. In the event that the negative signal on the lead 65 decreases to become less negative such that the polarity of the signal variation is positive, the diode 22 will cut off, and the capacitor 21 will be isolated from that positive variation in the signal level. On the other hand, if the signal level of the lead 25 becomes even more negative( negative variation of the level), the diode 22 will conduct, and the voltage level stored by the capacitor 21 will likewise become more negative. During the intervals when a vehicle 14 moves over the loop 12, the negative signal level of the lead 65 will decrease, cutting off the diode 22 such that a previously stored signal level will remain in the capacitor 21 for a duration of time dependent upon the discharge path of the capacitor 21. A resistor 69 may be coupled across the capacitor by a switch 71 to provide a relatively fast rate of discharge when a pulse mode of operation is desired for counting vehicles or for other applications where it is unnecessary for the presence detector system to sense the presence of a vehicle for a long duration of time. In the pulse mode of operation, the signal level stored by the capacitor 21 will remain at variance with the signal level of the lead 65 for only a short duration of time whenever a vehicle moves into the field of the loop 12.

If a vehicle presence indication is desired for a longer period of time such that the system will continue to "see" a stationary vehicle over the loop, the switch 71 is opened, and the discharge path for the capacitor 21 becomes three transistors 72, 73, and 74, connected as a Darlington amplifier. The collector electrode of each transistor is connected to the negative voltage supply —E, and the emitter electrode of each transistor is directly connected to the base electrode of the next subsequent transistor. The emitter of the final transistor 74 is coupled to the ground reference potential by a resistor 75. The effective value of the resistance path to ground for discharge of the capacitor 21 is equal to the resistance value of the resistor 75 multiplied by the beta, or amplification factor, of each of the three transistors. In a preferred embodiment of this invention, the resistor 75 was of a value of 10,000 ohms, and when this value is multiplied successively by the amplification factors of the three resistors, the effective resistive path for discharge of the capacitor 21 is approximately 1,000 megohms. With such a high resistive discharge path, the time constant of the capacitor 21, with the switch 71 open, will be of the order of 20 minutes, and the system will continue to "see" a stationary vehicle over the loop for approximately that time interval.

A voltage appearing at the emitter electrode of the transistor 74 will correspond with the voltage across the capacitor 21. A transistor 76 is coupled between the final stage 74 of the Darlington amplifier and a lead 77 for passing the AGC voltage thereto. As indicated heretofore, the AGC voltage of the lead 77 is passed by the resistor 51 to control the conduction through the transistor 41 and the diode 42, thereby controlling the gain of the amplifier 16. It may therefore be appreciated that the capacitor 21, in conjunction with the Darlington amplifier 72, 73, 74 constitutes a delayed AGC feedback circuit for controlling the amplifier 16. In the event that a vehicle 14 moves into the loop, the capacitor 21 becomes isolated such that the prior AGC voltage will remain to control the amplifier 16 for substantially the duration of the time constant of the capacitor 21 and high impedance discharge path. On the other hand, if the vehicle 14 suddenly departs from the field of the loop 12, the polarity of the signal level variation appearing at the lead 65 will be such that the diode 22 will conduct to provide an instantaneous change in the AGC voltage level. The AGC network with its single polarity long time constant will establish a voltage differential when the parameters of the loop 12 change abruptly due to the entrance of a vehicle thereover. On the other hand, the long time constant AGC corrects for all gradual variations of the vehicle presence detector system which may be caused by changes in weather and environmental conditions or which may be caused by aging of components or for any other reasons.

The amplifier 23 includes two transistors 78 and 79 connected as a differential circuit. The AGC level of the lead 77 is directly coupled to the base electrode of the transistor 78, and the direct potential level from the amplifier 18 appearing on the lead 65 is directly coupled to the base electrode of the transistor 79. The emitter electrodes of both transistors 78 and 79 are coupled to the ground reference potential by a common resistor 81. The collector electrode of the transistor 78 is directly connected to the negative voltage source —E, and the collector electrode of the transistor 79 is coupled to the negative voltage source —E by a resistor 82 which is bypassed by a capacitor 83. The differential amplifier 23 is arranged to provide an output signal on the lead 24 during intervals when the diode 22 is cut off, and the AGC level of the lead 77, which is derived from the voltage across the capacitor 21, is at variance with the voltage level appearing on the lead 65. During the normal intervals when the diode 22 is conductive, the voltage across the capacitor 21 is two volts more positive than the signal level of the lead 65, and the differential amplifier will produce no signal output on the lead 24.

Normally the transistor 78 is nonconductive, while the transistor 79 is conductive. When a vehicle 14 moves over the loop 12, the signal on lead 65 becomes less negative (positive polarity of signal variation), and the diode 22 cut off, isolating the capacitor 21, which retains its normal charge and holds the AGC signal essentially constant on the lead 77. Under vehicle presence conditions, the signal of lead 65 is more positive than that of lead 77, and the transistor 79 is cut off. Therefore, the transistor 85 becomes likewise cut off, causing the transistor 86 to become conductive and to energize the relay 26. This condition will remain until the vehicle 14 departs from the loop 12 or until the time constant of the capacitor 21 "runs out," whereupon the signals of leads 65 and 77 become essentially equalized, and the system returns to normal— de-energizing the relay 26.

The relay driver circut 26 as shown in FIGURE 2 is a Schmitt trigger circuit and comprises a first transistor 85 and a final transistor 86. The collector electrode of the transistor 85 is coupled to the ground reference potential by a load resistor 87. The signal is passed from the transistor 85 to the base electrode of the transistor 86 by a coupling resistor 88. The base electrode of the transistor 86 is coupled to the negative voltage source —E by a resistor 89. Both emitter electrodes of the transistors 85 and 86 are coupled to the negative voltage source —E by a resistor 89. Both emitter electrodes of the transistors 85 and 86 are coupled to the negative voltage source —E by a common resistor 91. The collector electrode of the final transistor 86 is coupled to the ground reference potential through the operating winding of the relay 26, whereby a switching operation of output terminals 93 is effected when the transistor 86 of the Schmitt trigger changes states from nonconduction to conduction and vice versa. A diode 94 is coupled across the operation winding of the relay 26 to provide a conduction path for the relay coil when transistor 86 is cut off.

The relay driver 25 and relay 26 provides the switching operations required by certain traffic controllers which may be used with the vehicle presence detector system of this invention. In other applications, the presence or absence of a signal on the output lead 24 may be used directly, and the relay driver 25 and relay 26 may not be required. Thus, the system of this invention will provide an output signal on the lead 24 which may be used independently of the relay circuitry shown in the drawings.

The vehicle presence detector system of this invention enjoys several advantages over prior vehicle detection systems. Although the induction loop is coupled into the tuned circuit 13 of the oscillator 11, the frequency variation of the oscillator signal is ignored, and the amplitude variation thereof is sensed. The amplitude of the oscillator signal varies principally because of the variation in the Q factor of the loop which is a result of a variation in power dissipated by the loop, which may be absorbed by a vehicle. The vehicle 14, moving over the loop, effectively provides shorted turns of a metallic mass inductively coupled to the loop, and it may be likened to the placing of a shorted secondary winding on a transformer, the loop being the primary winding. Therefore, the vehicle causes the loop to dissipate power at a greater rate to increase the load on the oscillator, causing a decrease in amplitude of the output signal thereof.

By providing a coupling transformer 32 between the loop and the other elements of the tuned circuit 13, the loop is effectively floating or isolated from the group reference potential and from the negative voltage source —E. This provides an advantage of making the loop immune to noise pickup and particularly making the loop immune to pickup of 60-cycle hum from adjacent leads which may lie in close proximity to the lead-in cable from the loop 12.

Another further advantage of this circuit is the fact that the system need not be tuned in the field to any particular loop installation. When the loop is coupled to the system, the oscillator will oscillate at some frequency in the range of 50 kilocycles to 200 kilocycles, depending upon the loop parameters and the values of the capacitor 33 and 34. The frequency of oscillation is of no consequence to this system; and the absolute value of the amplitude of the oscillator signal is likewise of no consequence. The subquent circuitry coupled to the oscillator merely senses changes in the amplitude of the signal to provide a switching operation when a vehicle moves over the loop.

A further advantage of the vehicle presence detector system of this invention stems from the fact that no attempt is made to control the frequency of the oscillator, and the frequency of oscillation of each system will be different from the frequencies of other similar systems which may be installed in close proximity with each other. In a typical highway intersection, six or more vehicle presence detectors may be placed within a single control box with lead-in cables extending through common conduits or channels out to different inductive loops—all embedded in the roadway under various vehicular approach lanes leading to the highway intersection. Some of the loops may be close enough to each other such that inductive coupling may exist therebtween. Inductive coupling may also exist between the various lead-in cables. However, the traffic engineers and equipment installers need not concern themselves with the problem of coupling or "cross-talk" between the various loops, because each loop will carry a signal of a frequency different from the freqeuncies of the other loops. It has been found totally unnecessary to preplan or pre-establish the various frequencies of oscillation. Upon installation, the various manufactured systems are connected to the various loops which have been previously installed beneath the roadways without regard to the frequencies involved. Experience has proven that each system will oscillate at a random frequency different from all others at the particular highway intersection, and that no system will interfere with the operation of any other system.

Since the frequency of the oscillator signal is of no consequence, it is not necessary that the AGC feedback path be coupled in any way to the oscillator. Thus, the oscillator becomes free-running without being influenced by the operation of the subsequent circuitry connected thereto, and the AGC is applied to control the gain of the amplifier which receives the oscillator signal. Therefore, the subsequent circuitry can be adequately stabilized without operating in any manner upon the free-running oscillator.

The invention is claimed as follows:

1. A vehicle presence detector system comprising an oscillator circuit adapted to be electrically connected to an inductive loop positioned in spaced relationship with a traffic lane for vehicles, said oscillator circuit being operable to generate a signal which varies in amplitude when a vehicle moves iinto spaced relation with the loop, a controllable gain amplifier coupled to the oscillator and operable to receive and amplify the signal therefrom, output means coupled to the amplifier for providing output signals responsive to variations in the amplitude of the signal from the oscillator, and a feedback means having a long time constant coupled to the amplifier for controlling the gain thereof to compensate for drift variations of the oscillator and of the amplifier.

2. A vehicle presence detector system comprising an oscillator circuit adapted to be electrically connected to an inductive loop positioned beneath a traffic lane for vehicles, said oscillator circuit being operable to generate a signal which varies in amplitude when a vehicle moves over the loop, a controllable gain amplifier coupled to receive and amplify the signal from the oscillator, a rectifying means coupled to amplifier for generating a direct signal level corresponding to the amplitude of the amplified signal, automatic gain control means coupled between the rectifying means and the amplifier for correcting the amplifier gain to compensate for drift variations of the vehicle detector system, and output means coupled to the rectifying means for generating an output signal indicative of the presence of a vehicle in response to a variation in the direct signal level.

3. A vehicle presence detector system in accordance with claim 2 wherein the automatic gain control means comprises a double time constant feedback path for correcting the gain of the amplitude in accordance with polarity of change which may appear in the direct signal level, said feedback path being operable to delay the gain correction through a long time constant in response to a direct signal variation of a first polarity and being further operable to pass the gain correction with a minimum time constant in response to a direct signal variation of the opposite polarity.

4. A vehicle presence detector system in accordance with claim 2 wherein the automatic gain control means includes a storage means and a unidirectional conduction device coupled between the rectifying means and the storage means, said unidirectional conduction device being operable to isolate the storage means from the rectifying means in response to direct signal variations of a first polarity and being further operable to conduct and pass to the storage means those signal variations of the opposite polarity.

5. A vehicle presence detector system comprising an oscillator circuit adapted to be electrically connected to an inductive loop positioned beneath a traffic lane for vehicles, said oscillator circuit operable to generate a signal which varies in amplitude when a vehicle moves over the loop, a controllable gain amplifier coupled to the oscillator for receiving and amplifying the signal from the oscillator, a rectifying means coupled to the amplifier for generating a direct voltage level corresponding to the amplitude of the signal from the amplifier, a storage means, a unidirectional conduction device coupled between the rectifying means and the storage means for passing signal level changes of a first polarity to the storage means and for isolating the storage means from signal level changes of the opposite polarity, means coupled between the storage means and the amplifier for controllably varying the gain of the amplifier in response to the signal level appearing in the storage means, a differential amplifier means coupled to the rectifying means and to the storage means for generating and output signal when the signal level appearing in the storage means does not correspond with the signal generated by the rectifying means.

6. A vehicle presence detector system in accordance with claim 5 and further comprising a transformer coupled to the inductive loop and further coupled to capacitive elements to form a tuned circuit, said inductive loop being operable to vary in inductance value and to vary in the valve of Q factor when a vehicle moves thereover whereby both the frequency and the amplitude of the oscillator signal will vary in response to the vehicle movement.

7. A vehicle presence detector system in accordance with claim 5 wherein the oscillator circuit comprises a Colpitts oscillator having a tuned circuit, said tuned circuit including capacitive elements, a transformer and the inductive loop, said transformer being operable to couple the inductive loop to the capacitive element and being further operable to isolate the inductive loop from all fixed voltage levels, said inductive loop being operable to pass power from the oscillator circuit to a vehicle which may move thereover to load the oscillator and to decrease the amplitude of the generated signal.

8. A vehicle presence detector system in accordance with claim 5, wherein the storage means comprises a capacitor, and wherein the unidirectional conduction device comprises a semiconductor diode coupled between the capacitor and the rectifying means whereby conduction of the diode during intervals when the direct voltage level is increasing will charge the capacitor, and whereby nonconduction of the diode during intervals when the direct voltage level is decreasing will isolate the capacitor.

9. A vehicle presence detector circuit in accordance with claim 8 wherein the means coupled between the storage means and the amplifier comprises a plurality of transistors connected in tandem as a Darlington circuit whereby the voltage appearing across the capacitor may effectively control the gain of the controllable gain amplifier and whereby a high impedance will be presented to the capacitor to preserve the isolation thereof.

10. A vehicle presence detector circuit in accordance with claim 8 and further comprising a resistance element and a means for selectively switching the resistance element across the capacitor, said resistance element and said switching means constituting a time constant circuit for discharging the capacitor to effect a pulse mode of operation whereby the vehicle presence detector system may be used for counting vehicles.

References Cited

UNITED STATES PATENTS 2,983,852   5/1961   Gray.

THOMAS B. HABECKER, *Primary Examiner.*

U.S. Cl. X.R.

331—109, 117, 182; 340—258